United States Patent
Christensen

(10) Patent No.: US 10,959,407 B2
(45) Date of Patent: Mar. 30, 2021

(54) METHOD AND SYSTEM FOR TIMED PET ENTERTAINMENT

(71) Applicant: Jonathan Whitaker Christensen, Plano, TX (US)

(72) Inventor: Jonathan Whitaker Christensen, Plano, TX (US)

(*) Notice: Subject to any disclaimer, the term of this patent is extended or adjusted under 35 U.S.C. 154(b) by 476 days.

(21) Appl. No.: 15/195,656

(22) Filed: Jun. 28, 2016

(65) Prior Publication Data

US 2016/0302389 A1 Oct. 20, 2016

Related U.S. Application Data

(63) Continuation-in-part of application No. 14/296,808, filed on Jun. 5, 2014, now Pat. No. 9,596,831.

(60) Provisional application No. 62/189,067, filed on Jul. 6, 2015, provisional application No. 61/831,709, filed on Jun. 6, 2013.

(51) Int. Cl.
*A01K 15/02* (2006.01)
*A01K 27/00* (2006.01)

(52) U.S. Cl.
CPC .......... *A01K 15/026* (2013.01); *A01K 15/021* (2013.01); *A01K 15/025* (2013.01); *A01K 27/001* (2013.01)

(58) Field of Classification Search
CPC ...... A01K 5/02; A01K 5/0225; A01K 5/0275; A01K 5/0291; A01K 15/025; A01K 15/026
USPC .......... 119/51.02, 51.11, 702, 707, 709, 710, 119/61.5; 222/638, 650
See application file for complete search history.

(56) References Cited

U.S. PATENT DOCUMENTS

| | | | |
|---|---|---|---|
| 3,435,804 A * | 4/1969 | Orlowski | A01K 61/85 119/51.11 |
| 3,720,186 A | 3/1973 | O'Rourke | |
| 3,874,341 A | 4/1975 | Riba | |
| 4,296,710 A * | 10/1981 | Sillers, III | A01K 5/0291 119/51.11 |
| 4,866,880 A | 9/1989 | Weinblatt | |
| 4,889,077 A | 12/1989 | Possis | |
| 5,078,097 A | 1/1992 | Chisholm | |
| 5,176,103 A | 1/1993 | Reid et al. | |

(Continued)

FOREIGN PATENT DOCUMENTS

| | | |
|---|---|---|
| GB | 2128868 A | 5/1984 |
| GB | 2 166 933 A | 5/1986 |

(Continued)

OTHER PUBLICATIONS

English-language translation of TW M479015 (Year: 2014).*

(Continued)

*Primary Examiner* — Lisa L Tsang
(74) *Attorney, Agent, or Firm* — Winstead PC

(57) ABSTRACT

A chewable pet-entertainment device that includes a treat cage and a first body portion removably coupled to the treat cage. A second body portion is operatively coupled to the treat cage. The first body portion and the second body portion together conceal the treat cage. A timer is disposed in at least one of the first body portion and the second body portion. Responsive to the timer measuring a set period of time, the first body portion opens relative to the second body portion allowing access to the treat cage.

14 Claims, 12 Drawing Sheets

(56) References Cited

U.S. PATENT DOCUMENTS

| | | | |
|---|---|---|---|
| 5,526,966 A * | 6/1996 | Lutzker | B65D 11/02 |
| | | | 222/480 |
| 5,669,328 A | 9/1997 | Lanfranchi | |
| 5,758,604 A | 6/1998 | Jørgensen | |
| 5,819,690 A | 10/1998 | Brown | |
| 6,073,581 A | 6/2000 | Wang | |
| 6,098,571 A * | 8/2000 | Axelrod | A01K 15/025 |
| | | | 119/707 |
| 6,158,391 A | 12/2000 | Simonetti | |
| 6,237,538 B1 | 5/2001 | Tsengas | |
| 6,349,671 B1 | 2/2002 | Lewis et al. | |
| 6,367,417 B1 | 4/2002 | Gal et al. | |
| 6,405,682 B1 | 6/2002 | Simon | |
| 6,484,671 B2 | 11/2002 | Herrenbruck | |
| 6,688,258 B1 | 2/2004 | Kolesar | |
| 6,694,916 B1 | 2/2004 | Rucker et al. | |
| 6,988,465 B2 | 1/2006 | Park | |
| 7,051,675 B1 | 5/2006 | Mayer et al. | |
| 7,143,719 B1 | 12/2006 | Giddens et al. | |
| 7,166,047 B2 | 1/2007 | May et al. | |
| 7,270,080 B1 | 9/2007 | Kane | |
| 7,395,782 B1 | 7/2008 | Lindsay | |
| 7,631,613 B2 | 12/2009 | Lescroart | |
| 7,650,855 B2 | 1/2010 | Krishnamurthy | |
| 7,832,362 B2 | 11/2010 | DeGhionno | |
| 8,141,521 B2 | 3/2012 | Shatoff et al. | |
| 8,225,747 B2 | 7/2012 | Markham et al. | |
| 8,424,489 B2 | 4/2013 | Desrosiers | |
| 8,464,666 B2 | 6/2013 | Chefetz et al. | |
| 8,640,647 B2 | 2/2014 | Dotterer | |
| 8,888,552 B2 * | 11/2014 | Wizenberg | A63H 33/086 |
| | | | 446/102 |
| 9,288,969 B2 | 3/2016 | Christianson et al. | |
| 9,675,049 B2 * | 6/2017 | Cheng | A01K 5/02 |
| 2003/0150398 A1 | 8/2003 | Nathanson et al. | |
| 2004/0134434 A1 | 7/2004 | Kraft et al. | |
| 2005/0066905 A1 | 3/2005 | Morosin et al. | |
| 2006/0054106 A1 * | 3/2006 | Renforth | A01K 15/025 |
| | | | 119/711 |
| 2006/0213453 A1 | 9/2006 | Conrady | |
| 2007/0022971 A1 | 2/2007 | Renforth et al. | |
| 2007/0068464 A1 | 3/2007 | Smith et al. | |
| 2008/0083378 A1 | 4/2008 | Pearce | |
| 2009/0095231 A1 * | 4/2009 | Axelrod | A01K 15/026 |
| | | | 119/709 |
| 2009/0255474 A1 * | 10/2009 | Gleesing | A01K 61/85 |
| | | | 119/51.04 |
| 2009/0314221 A1 | 12/2009 | Wang | |
| 2010/0095896 A1 | 4/2010 | Van Wye | |
| 2010/0147226 A1 | 6/2010 | Tsengas | |
| 2011/0083608 A1 | 4/2011 | Markham et al. | |
| 2011/0226187 A1 * | 9/2011 | Bertsch | A01K 5/0114 |
| | | | 119/61.55 |
| 2012/0012068 A1 | 1/2012 | Costello | |
| 2012/0103274 A1 * | 5/2012 | Curry | A01K 15/025 |
| | | | 119/707 |
| 2012/0160176 A1 | 6/2012 | Murphy et al. | |
| 2012/0298044 A1 | 11/2012 | Dotterer | |
| 2013/0055965 A1 * | 3/2013 | Valle | A01K 15/025 |
| | | | 119/710 |
| 2013/0192528 A1 * | 8/2013 | Dreger | A01K 5/0114 |
| | | | 119/61.5 |
| 2013/0233246 A1 | 9/2013 | Wang | |
| 2014/0251231 A1 * | 9/2014 | Hansen | A01K 15/025 |
| | | | 119/710 |
| 2015/0128875 A1 * | 5/2015 | Christianson | A01K 5/0114 |
| | | | 119/707 |
| 2015/0342145 A1 | 12/2015 | Christianson et al. | |
| 2016/0219835 A1 * | 8/2016 | Faecher | A01K 15/025 |
| 2016/0295836 A1 * | 10/2016 | Cheng | A01K 5/02 |
| 2018/0160648 A1 * | 6/2018 | Goh | A01K 5/0114 |
| 2018/0199541 A1 * | 7/2018 | Huang | A01K 5/0114 |

FOREIGN PATENT DOCUMENTS

| | | | |
|---|---|---|---|
| TW | M479015 U * | 6/2014 | |
| WO | WO-2005025301 A1 | 3/2005 | |

OTHER PUBLICATIONS

CleverPet: A Dog Game Console for Automatic All Day Play, www.kickstarter.com, retrieved May 23, 2014 (19 pages).

Foobler: A Smarter Puzzle Feeder for Your Dog, www.kickstarter.com, retrieved May 23, 2014 (11 pages).

Busy Buddy Kibble Nibble, available at http://store.petsafe.net, retrieved May 23, 2014 (4 pages).

Marathon Ball, available at www.kongcompany.com, retrieved May 23, 2014, (1 page).

Pre-Order your Foobler here Now!, available at http://thefoobler.com, retrieved May 23, 2014, (2 pages).

PCT International Search Report, PCT/US2014/041077, dated Oct. 31, 2014.

* cited by examiner

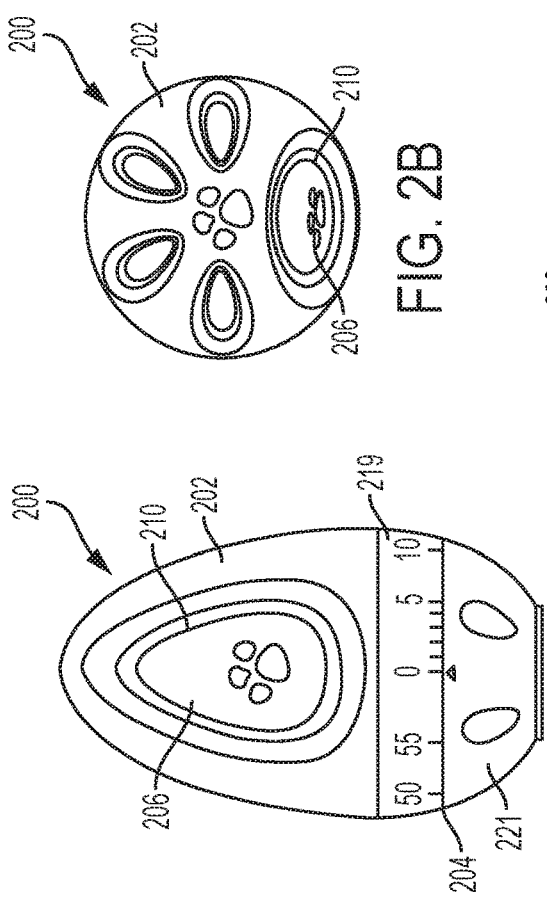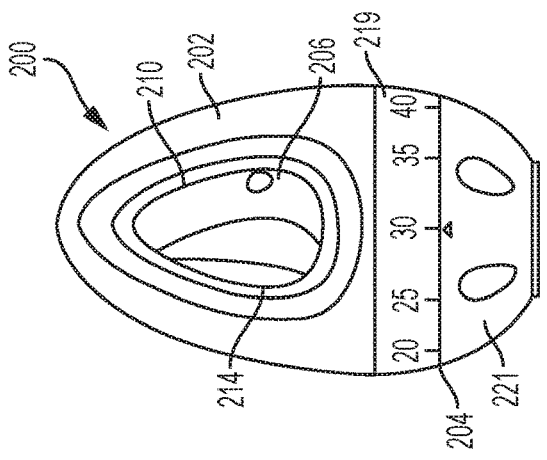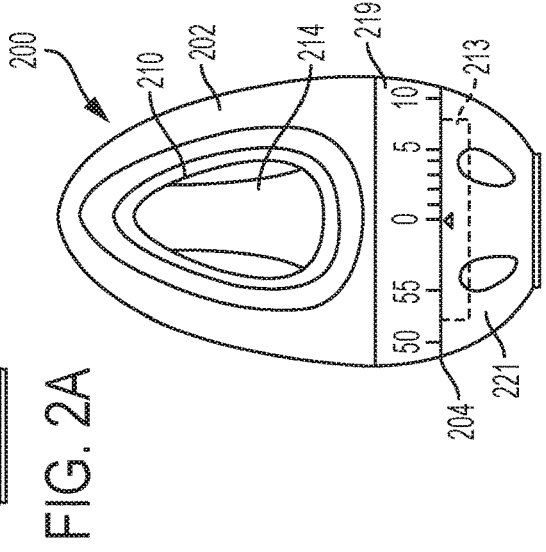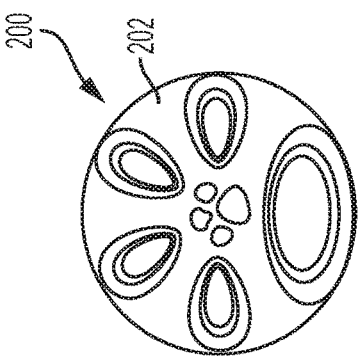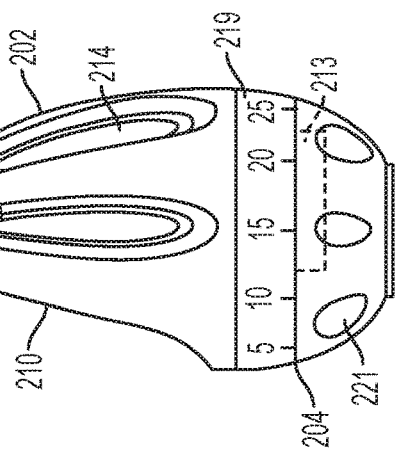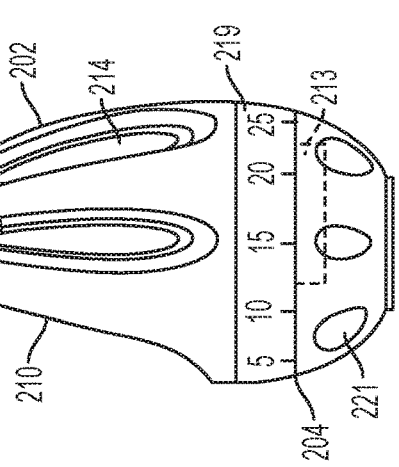

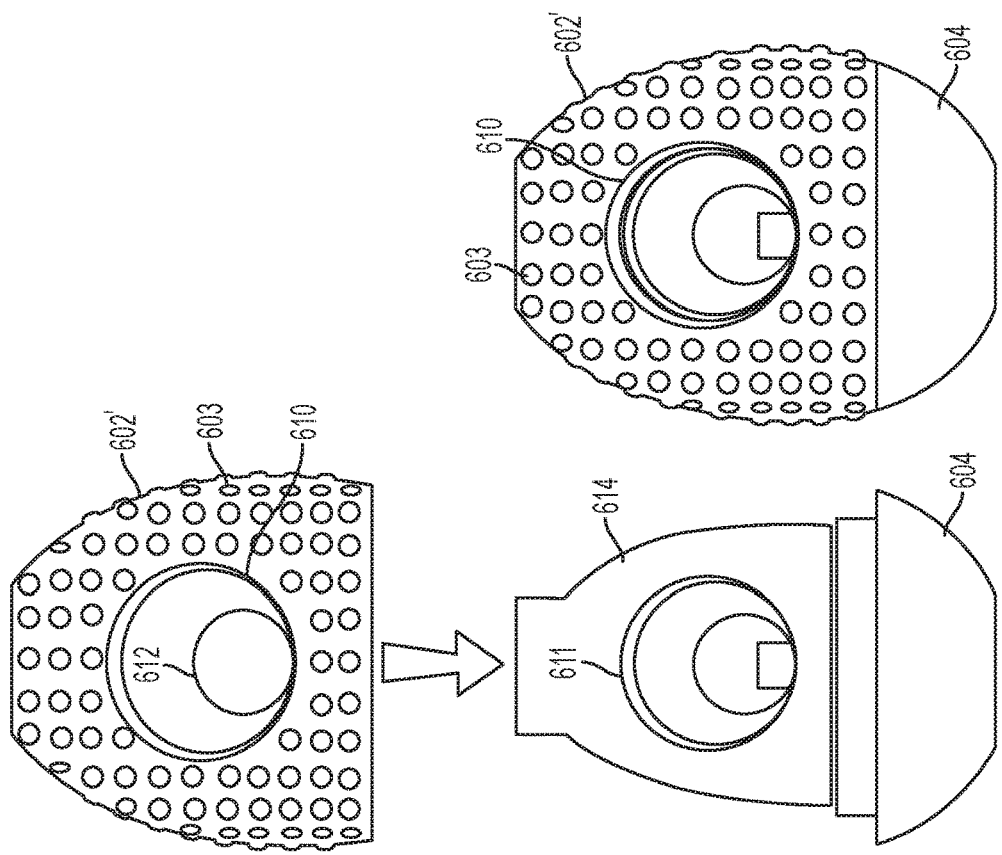
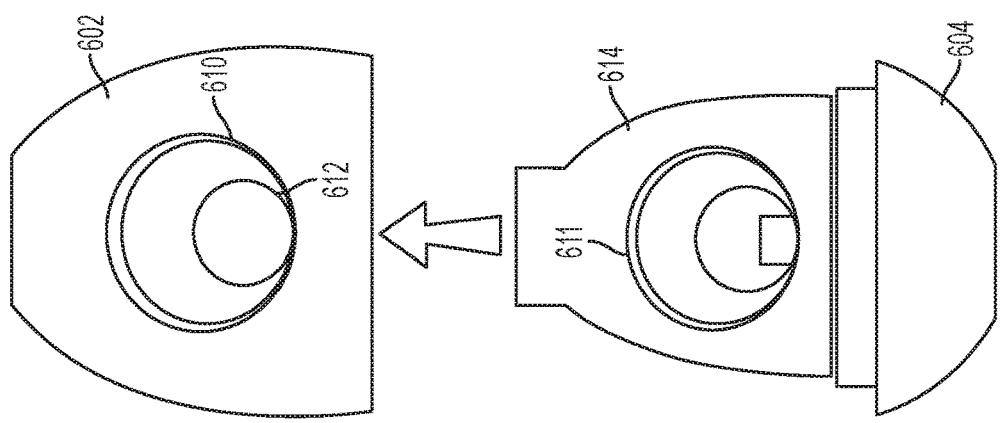
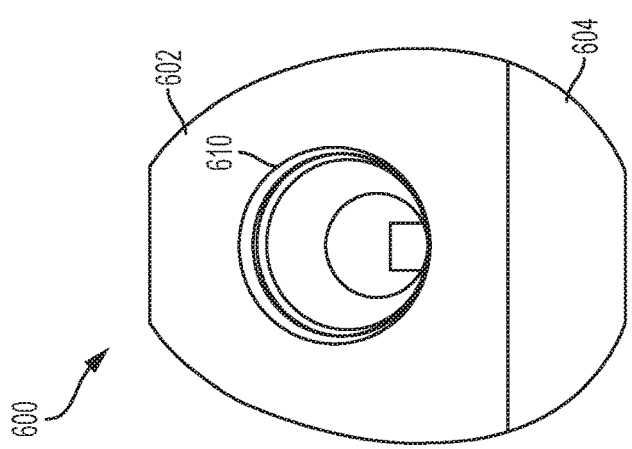
FIG. 6A  FIG. 6B  FIG. 6C  FIG. 6D

METHOD AND SYSTEM FOR TIMED PET ENTERTAINMENT

CROSS-REFERENCE TO RELATED APPLICATIONS

This patent application is a continuation in part of U.S. patent application Ser. No. 14/296,808 filed on Jun. 5, 2014. This application claims priority to U.S. Provisional Patent Application No. 62/189,067, filed Jul. 6, 2015. U.S. patent application Ser. No. 14/296,808 claims priority to U.S. Provisional Patent Application No. 61/831,709, filed Jun. 6, 2013. U.S. patent application Ser. No. 14/296,808; U.S. Provisional Patent Application No. 62/189,067; and U.S. Provisional Patent Application No. 61/831,709 are each incorporated herein by reference.

BACKGROUND

Field of the Invention

The present invention relates generally to pet toys and more particularly, but not by way of limitation, to chewable pet toys having an integrated timer that distributes an edible treat after a set period of time.

History of the Related Art

Pet toys are extremely popular items amongst pet owner and retailers alike. Most chewable pet toys are constructed from a durable material such as, for example, high-density rubber. Some Pet toys allow for insertion of an edible treat. In such pet toys, the edible treat is often held in place by friction. A pet is enticed by the smell of the edible treat to play with the chewable toy. Over time, the pet works the edible treat loose and consumes it. Such pet toys typically occupy a pet for only a short time and, once the treat is consumed, the pet often loses interest.

SUMMARY

The present invention relates generally to pet toys and more particularly, but not by way of limitation, to chewable pet toys having an integrated timer that distributes an edible treat after a set period of time. In one aspect, the present invention relates to a chewable pet-entertainment device. The chewable pet-entertainment device includes a treat cage and a first body portion removably coupled to the treat cage. A second body portion is operatively coupled to the treat cage. The first body portion and the second body portion together conceal the treat cage. A timer is disposed in at least one of the first body portion and the second body portion. Responsive to the timer measuring a set period of time, the first body portion opens relative to the second body portion allowing access to the treat cage.

In another aspect, the present invention relates to a chewable pet-entertainment device. The chewable pet-entertainment device includes a treat cage and a first body portion removably coupled to the treat cage. The first body portion is movable between an open position and a closed position. A second body portion is coupled to the treat cage. The first body portion and the second body portion conceal the treat cage. A timer mechanism is disposed in at least one of the first body portion and the second body portion. An opening is defined in the first body portion. The opening allows access to the treat cage when the first body portion is in the open position and the opening is obstructed when the first body portion is in the closed position. Responsive to the timer mechanism measuring a set period of time, the first body portion moves from the closed position to the open position allowing access to the treat cage.

In another aspect, the present invention relates to a method of pet entertainment. The method includes charging a chewable pet-entertainment device with at least one edible treat and rotating a first body portion relative to a treat cage to conceal the edible treat. The method includes setting a timer mechanism to measure a set period of time. Responsive to the set period of time being measured, the first body portion is opened relative to the treat cage to allow access to the edible treat.

BRIEF DESCRIPTION OF THE DRAWINGS

For a more complete understanding of the present invention and for further objects and advantages thereof, reference may now be had to the following description taken in conjunction with the accompanying drawings in which:

FIG. 2A is a front view of a chewable pet-entertainment device with a door in a closed position according to an exemplary embodiment;

FIG. 2B is a top view of the chewable pet-entertainment device of FIG. 2A with the door in the closed position according to an exemplary embodiment;

FIG. 2C is a front view of the chewable pet-entertainment device of FIG. 2A with the door in a half-open position according to an exemplary embodiment;

FIG. 2D is a front view of the chewable pet-entertainment device of FIG. 2A with the door in an open position according to an exemplary embodiment;

FIG. 2E is a top view of the chewable pet-entertainment device of FIG. 2A with the door 206 in the open position according to an exemplary embodiment;

FIG. 2F is a side view of the chewable pet entertainment device of FIG. 2A with the door in the open position according to an exemplary embodiment;

FIG. 6A is a side view of a chewable pet-entertainment device having a modular body portion;

FIG. 6B is a side view of a chewable pet-entertainment device illustrating a removal of a first body portion according to an exemplary embodiment;

FIG. 6C is a side view of a chewable pet-entertainment device illustrating placement of a different first body portion according to an exemplary embodiment;

FIG. 6D is a side view of a chewable pet-entertainment device including a different first body portion according to an exemplary embodiment;

DETAILED DESCRIPTION

Various embodiments of the present invention will now be described more fully with reference to the accompanying drawings. The invention may, however, be embodied in many different forms and should not be construed as limited to the embodiments set forth herein.

Figure 1A:
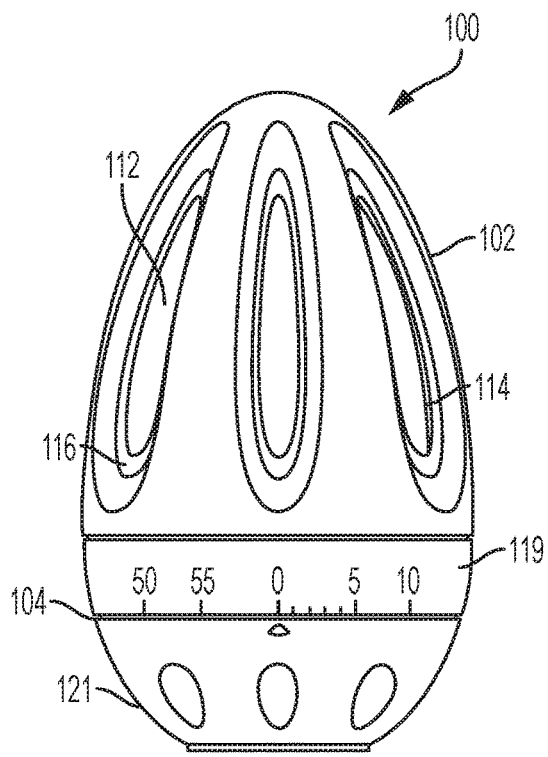
FIG. 1A is a front view of a chewable pet-entertainment device in a closed position according to an exemplary embodiment.
Figure 1B:
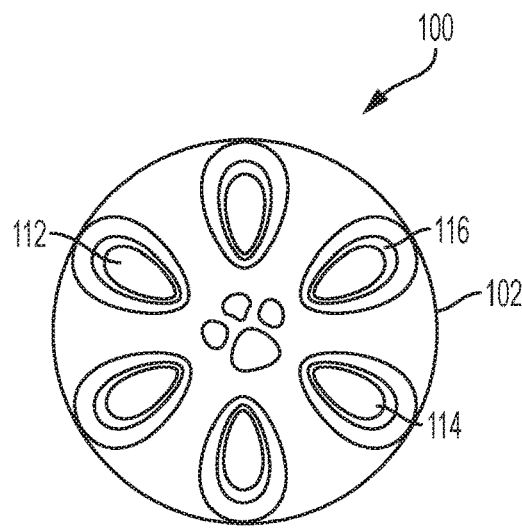
FIG. 1B is a top view of the chewable pet-entertainment device of FIG. 1A according to an exemplary embodiment.
Figure 1C:
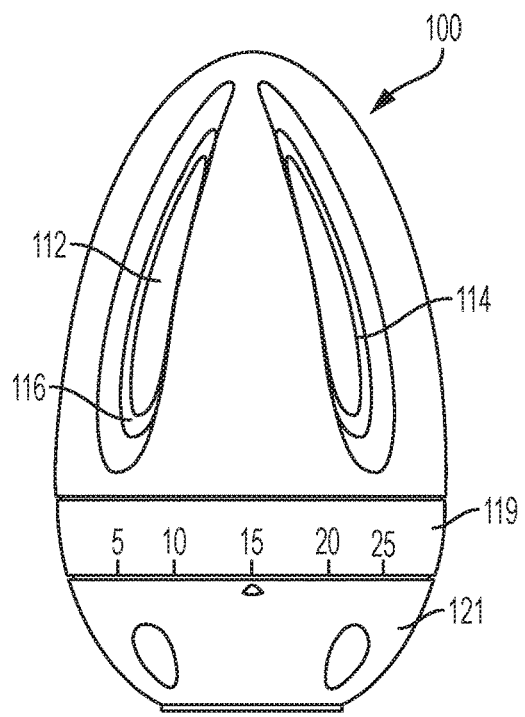
FIG. 1C is a side view of the chewable pet-entertainment device of FIG. 1A in the closed position according to an exemplary embodiment.
Figure 1D:
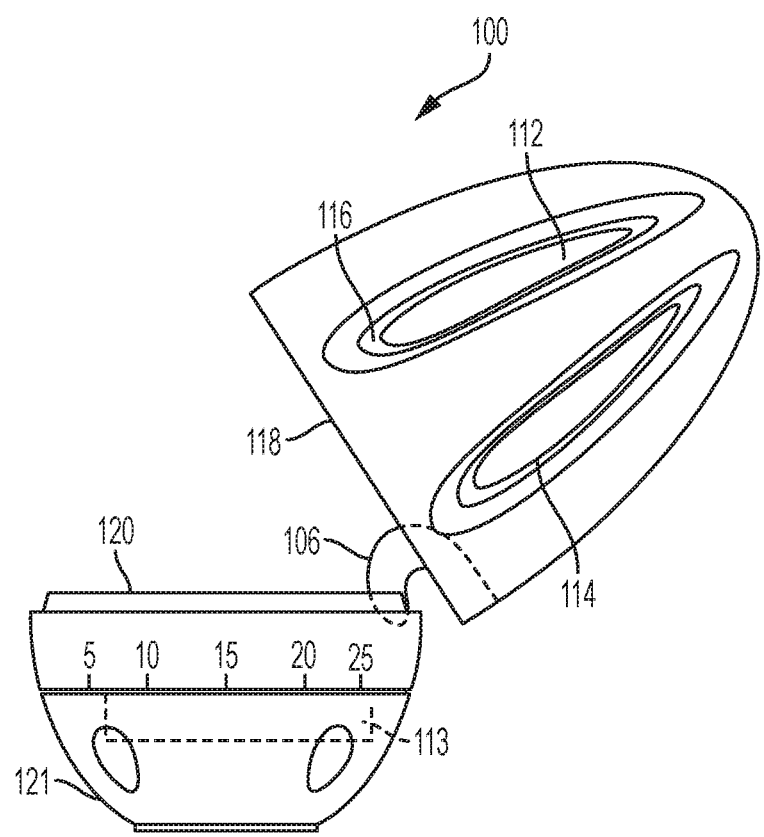
FIG. 1D is a side view of the chewable pet-entertainment device of FIG. 1A in an open position according to an exemplary embodiment.

FIG. 1A is a front view of a chewable pet-entertainment device 100 in a closed position. FIG. 1B is a top view of the chewable pet-entertainment device 100. FIG. 1C is a side view of the chewable pet-entertainment device in a closed position. FIG. 1D is a side view of the chewable pet-entertainment device 100 in an open position. Referring to FIGS. 1A-1D, the chewable pet-entertainment device 100 includes a first body portion 102 that is pivotably connected to a second body portion 104 at a hinge 106. A latch (not shown) is disposed on a lower face 118 of the first body portion 102 approximately 180 degrees from the hinge 106. In a typical embodiment, the latch is received into a lock (not shown) that is disposed on an upper face 120 of the second body portion 104. In various embodiments, a spring may be utilized to bias the first body portion 102 to pivot at the hinge 106 and open in a "clam-shell" like manner relative to the second body portion 104. A treat cage 114 is formed in the first body portion 102 and is defined by an inner surface 116 of the first body portion 102 and the upper face 120 of the second body portion 104. When the first body portion 102 is in an open position, the treat cage 114 is accessible to a pet such as, for example, a dog. When the first body portion 102 and the second body portion 104 are in a closed position, access to the treat cage 114 is prevented. A plurality of openings 112 are formed through a thickness of the first body portion 102. By way of example, the treat cage 114 is shown in FIGS. 1A-1D as being disposed in the first body portion 102; however, in other embodiments, pet entertainment devices utilizing principles of the invention may include treat cages disposed in the second body portion 104. In a typical embodiment, the pet-entertainment device 100 is sized so as to be played with and chewed on by a pet such as, for example, a dog.

In a typical embodiment, the first body portion 102 and the second body portion 104 are constructed of a durable material such as, for example, high-density rubber, or other similar material. In some embodiments, the first body portion 102 and the second body portion 104 include a geometric pattern of raised surfaces (not shown). Such raised surfaces facilitate dental and periodontal hygiene when the chewable pet-entertainment device 100 is chewed on by a pet such as, for example, a dog. The raised surfaces may be applied to the first body portion 102 and the second body portion 104 through a process such as, for example, molding, stamping, embossing, or other appropriate process.

A timer mechanism 113 is disposed in at least one of the first body portion 102 and the second body portion 104. In a typical embodiment, the timer mechanism 113 is set by rotating a first region 121 of at least one of the second body portion 104 and the first body portion 102 relative to a second region 119. The second body portion 104 is illustrated by way of example in FIGS. 1A-1D as including the first region 121 and the second region 119. In other embodiments, the first body portion 102 may include the first region 121 and the second region 119. In various embodiments, the first region 121 may be a recessed dial located on one of a bottom face of the second body portion 104 and a top face of first body portion 102.

The timer mechanism 113, in a typical embodiment, establishes a set period of time that the latch remains secured in the lock thereby holding the first body portion 102 and the second body portion 104 in the closed position. Upon expiration of the set period of time, the latch becomes disengaged from the lock allowing the first body portion 102 and the second body portion 104 to pivot at the hinge 106 to the open position. In other embodiments, the timer mechanism 113 may be coupled to a receiver. In such embodiments, the timer mechanism 113 may be set via a transmitting device such as, for example, a cellular telephone or other similar device.

Figure 1E:
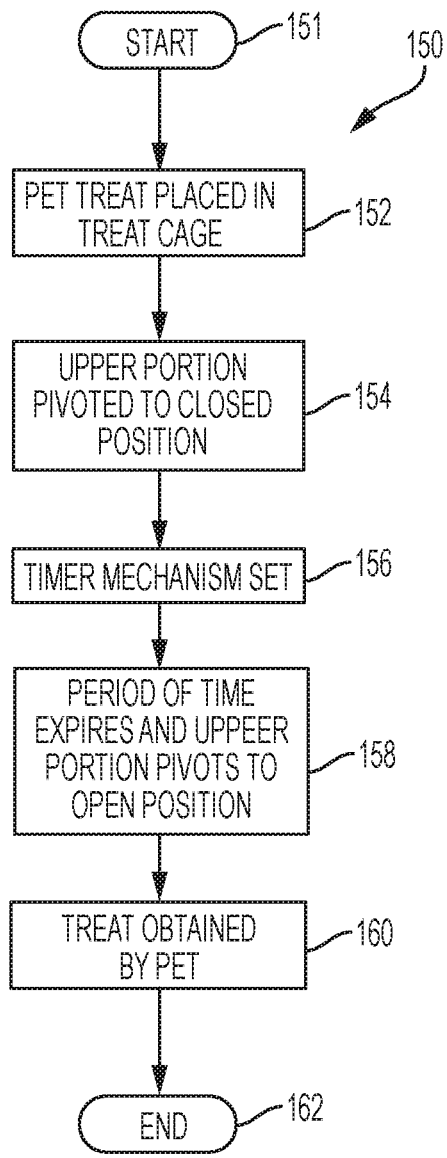
FIG. 1E is a flow diagram of a process for using the chewable pet-entertainment device of FIGS. 1A-1E according to an exemplary embodiment.

FIG. 1E is a flow diagram of a process 150 for using the chewable pet-entertainment device 100. The process 150 starts at step 151. At step 152, a pet treat is placed into the treat cage 114 of the first body portion 102. At step 154, the first body portion 102 is pivoted relative to the second body portion 104 until the latch is received into the lock. At step 156, the first region 121 of the second body portion 104 is twisted relative to the second region 119. Responsive to such twisting, the timer mechanism 113 establishes the set period of time. In some embodiments, steps 154 and 156 occur simultaneously. During the set period of time, the latch remains secured in the lock causing the first body portion 102 and the second body portion 104 to remain in the closed position. The plurality of openings 112, allow the pet treat to be detectable via smell, but not accessible, by a pet such as, for example, a dog.

At step 158, the set period of time expires and the latch becomes disengaged from the lock thereby allowing the first body portion 102 and the second body portion 104 to pivot at the hinge 106 to the open position. At step 160, the pet treat becomes accessible to the pet upon expiration of the set period of time. The process 150 ends at step 162.

Figure 5A:
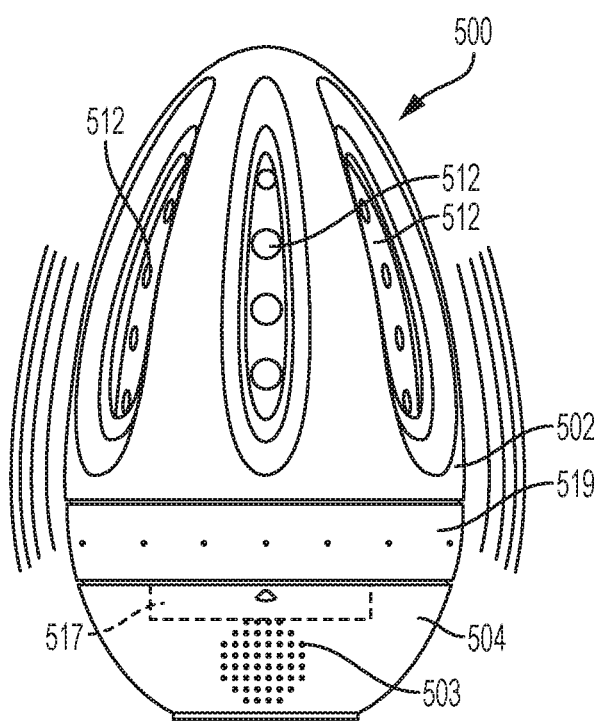
FIG. 5A is a side view of a chewable pet-entertainment device including a receiver according to an exemplary embodiment.
Figure 5C:
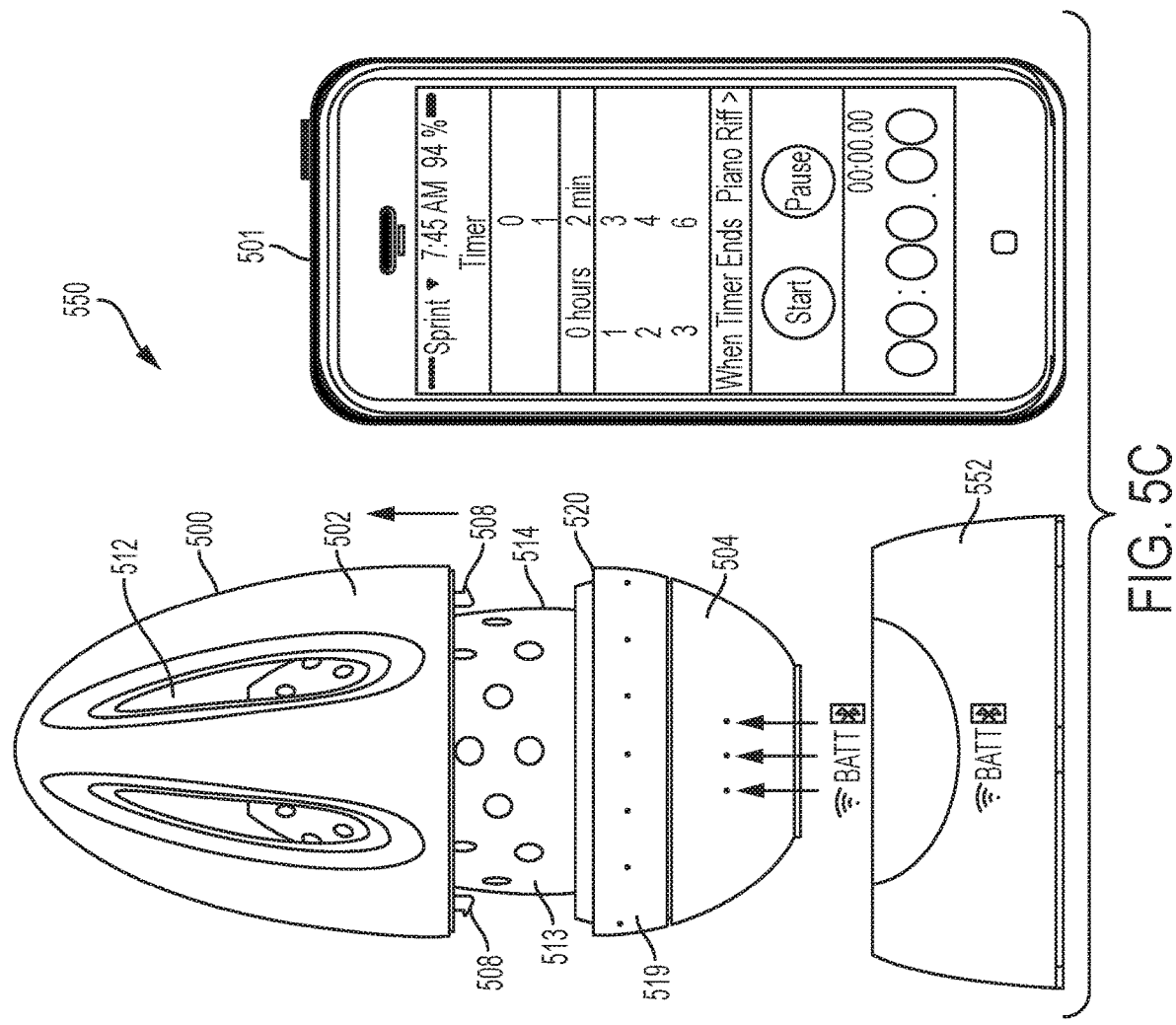
FIG. 5C is a side view of a pet-entertainment system, including the chewable pet-entertainment device of FIG. 5A according to an exemplary embodiment.

In a typical embodiment, a charging base similar to the charging base 552 shown in FIG. 5C receives at least part of the second body portion 104. In a typical embodiment, an electrical connection is established between the charging base and the chewable pet-entertainment device 100 to facilitate charging of a battery. In other embodiments, the charging base utilizes induction charging.

In other embodiments, the chewable pet-entertainment device 600 is capable of electronic pairing, such as, for example, Bluetooth® pairing, with, for example, a collar (not shown). During operation, if a first pet approaches the chewable pet-entertainment device 100 while wearing a first collar that is paired with the chewable pet-entertainment device 100, no action will be taken and the first pet will be allowed to play with the chewable pet-entertainment device 100. If, however, a second pet approaches the chewable pet-entertainment device 100 while wearing a second collar that is paired with a device other than the chewable pet-entertainment device 100, the chewable pet-entertainment device 100 emits a signal causing the second collar to vibrate thereby driving the second pet away from the chewable pet-entertainment device 100. In other embodiments, the chewable pet-entertainment device emits a sound that is unpleasant to the second pet thereby driving the second pet away from the chewable pet-entertainment device 100. Such an arrangement is advantageous in situations where two or more pets are in close proximity to each other.

In various embodiments, when the first body portion 102 opens relative to the second body portion 104 the chewable pet-entertainment device 100 provides alert messages to a transmitting device such as, for example, the transmitting device 501 shown in FIG. 5C, thereby alerting a pet owner that the chewable pet-entertainment device 100 has opened. The alert messages may be sent via a messaging protocol such as, for example, SMS, MMS, or any other messaging protocol. In various embodiments, the chewable pet-entertainment device 600 records an amount of time, via an activity log, that a pet is engaged with the chewable pet-entertainment device 100. The activity log may, in some embodiments, be transmitted by the chewable pet-entertainment device 100 to the transmitting device for review by a pet owner. In still other embodiments, the transmitting device provides a signal to the chewable pet-entertainment device 100 directing the first body portion 102 to open relative to the second body portion 104 without regard to the timer mechanism. Such an arrangement is useful in situations, for example, where a pet becomes frustrated by the chewable pet-entertainment device 100 by providing an instant reward to the pet.

FIG. 2A is a front view of a chewable pet-entertainment device 200 with a door 206 in a closed position. FIG. 2B is a top view of the chewable pet-entertainment device 200 with the door 206 in the closed position. FIG. 2C is a front view of the chewable pet-entertainment device 200 with the door 206 in a half-open position. FIG. 2D is a front view of the chewable pet-entertainment device 200 with the door 206 in an open position. FIG. 2E is a top view of the chewable pet-entertainment device 200 with the door 206 in the open position. FIG. 2F is a side view of the pet entertainment device 200 with the door 206 in the open position. Referring to FIGS. 2A-2F, the chewable pet-entertainment device 200 includes a first body portion 202 that is coupled to a second body portion 204. In a typical embodiment, the first body portion 202 and the second body portion 204 are constructed of a durable material such as, for example, high-density rubber, or other similar material. In some embodiments, the first body portion 202 and the second body portion 204 include a geometric pattern of raised surfaces (not shown). Such raised surfaces facilitate dental and periodontal hygiene when the chewable pet-entertainment device 200 is chewed on by a pet such as, for example, a dog. The raised surfaces may be applied to the first body portion 202 and the second body portion 204 through a process such as, for example, molding, stamping, embossing, or other appropriate process. A plurality of openings 212 are formed through a thickness of the first body portion 202. In a typical embodiment, the pet-entertainment device 200 is sized so as to be played with and chewed on by a pet such as, for example, a dog.

At least one opening 210 is formed in the first body portion 202. The at least one opening 210 provides access to a treat cage 214 disposed within the first body portion 202. When in a closed position, a door 206 covers the at least one opening 210 and prevents access to the treat cage 214. When in an open position, the door 206 does not cover the at least one opening 210 and the treat cage 214 is accessible to a pet such as, for example, a dog. By way of example, the treat cage 214 is shown in FIGS. 2A-2F as being disposed in the first body portion 202; however, in other embodiments, pet entertainment devices utilizing principles of the invention may include treat cages disposed in the second body portion 204. In various embodiments, at least one small opening may be formed in the door 206. When the at least one small opening is aligned with one of the at least one opening 210 and the plurality of openings 212, smaller sized treats may fall out of the treat cage 214 thereby maintaining the interest of the pet.

A timer mechanism 213 is disposed in at least one of the first body portion 202 and the second body portion 204. In a typical embodiment, the timer mechanism 213 is set by rotating a first region 221 of at least one of the second body portion 204 and the first body portion 202 relative to a second region 219. The second body portion 204 is illustrated by way of example in FIGS. 2A-2F as including the first region 221 and the second region 219. In other embodiments, the first body portion 202 may include the first region 221 and the second region 219. In various embodiments, first region 221 may be a recessed dial located on one of a bottom face of the second body portion 204 and a top face of first body portion 202.

The timer mechanism 213, in a typical embodiment, establishes a set period of time that the door 206 will remain in the closed position. As the set period of time expires, the door 206 rotates relative to the first body portion 202 to an open position. In other embodiments, the timer mechanism 213 may be coupled to a receiver. In such embodiments, the timer mechanism 213 may be set via a transmitting device such as, for example, a cellular telephone or other similar device.

Figure 2G:
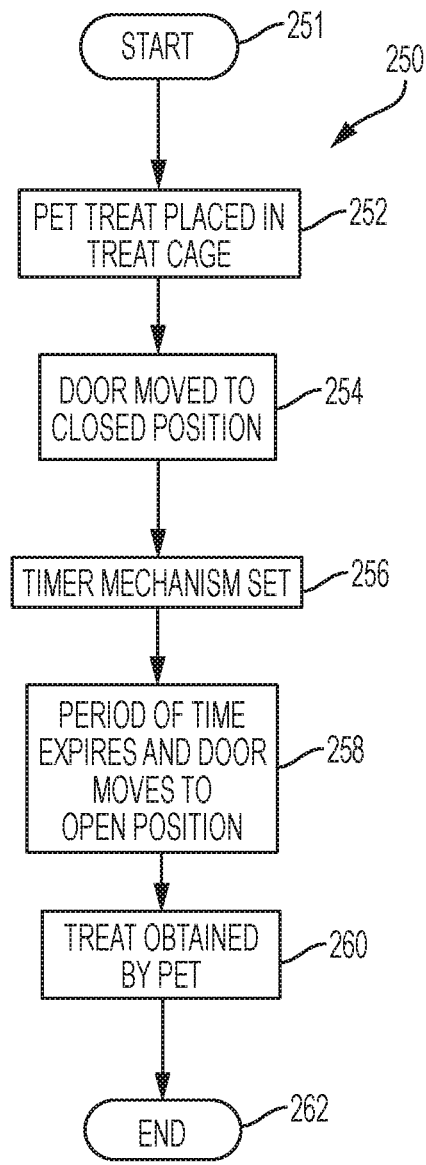
FIG. 2G is a flow diagram of a process for using the chewable pet-entertainment device of FIG. 2A according to an exemplary embodiment.

FIG. 2G is a flow diagram of a process 250 for using the chewable pet-entertainment device 200. The process 250 starts at step 251. At step 252, a pet treat is placed into the treat cage 214 of the first body portion 202. At step 254, the door 206 is rotated to the closed position. At step 256, the first region 221 is twisted relative to the second region 219.

In some embodiments, step 254 and 256 may occur simultaneously. Responsive to such twisting, the timer mechanism establishes the set period of time. During the set period of time, the door 206 remains in the closed position. When the door 206 is in the closed position, the plurality of openings 212, allow the pet treat to be detectable via smell, but not accessible, by a pet such as, for example, a dog.

At step 258, the door 206 begins to rotate to the open position as the set period of time approaches expiration. At step 260, the pet treat becomes accessible to the pet upon expiration of the set period of time. The process 250 ends at step 262. In various embodiments, as the door 206 rotates the at least one small opening passes the at least one opening 210 and each opening of the plurality of openings 212. Such action causes the small opening to open and close thereby allowing smaller treats to fall out of the treat cage 214 before expiration of the set period of time.

Figure 3A:
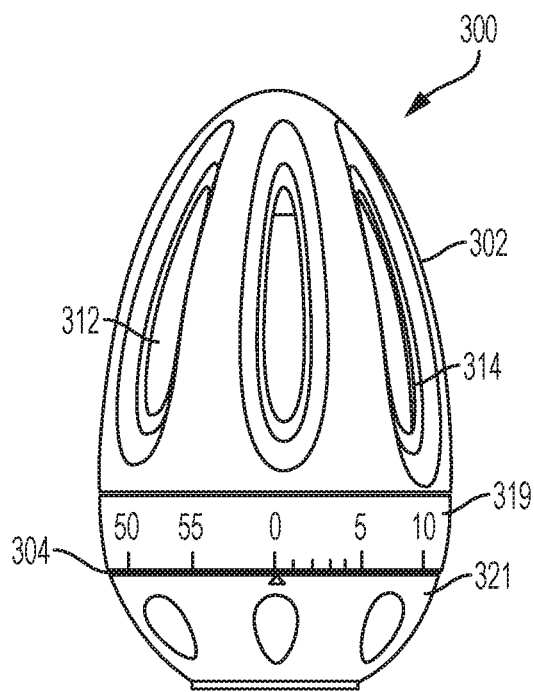
FIG. 3A is a front view of a chewable pet-entertainment device with a telescoping opening according to an exemplary embodiment.
Figure 3B:
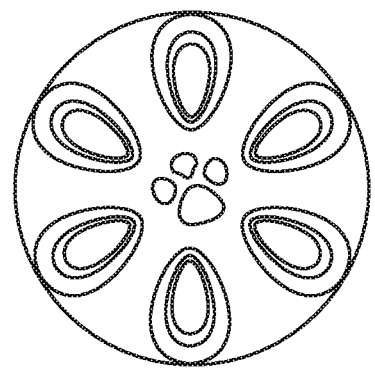
FIG. 3B is a top view of the chewable pet-entertainment device of FIG. 3A according to an exemplary embodiment.
Figure 3C:
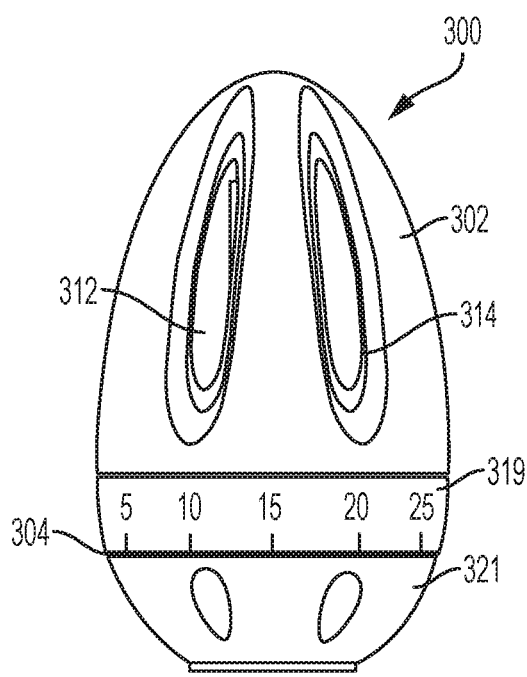
FIG. 3C is a side view of the chewable pet-entertainment device of FIG. 3A in a closed position according to an exemplary embodiment.
Figure 3D:
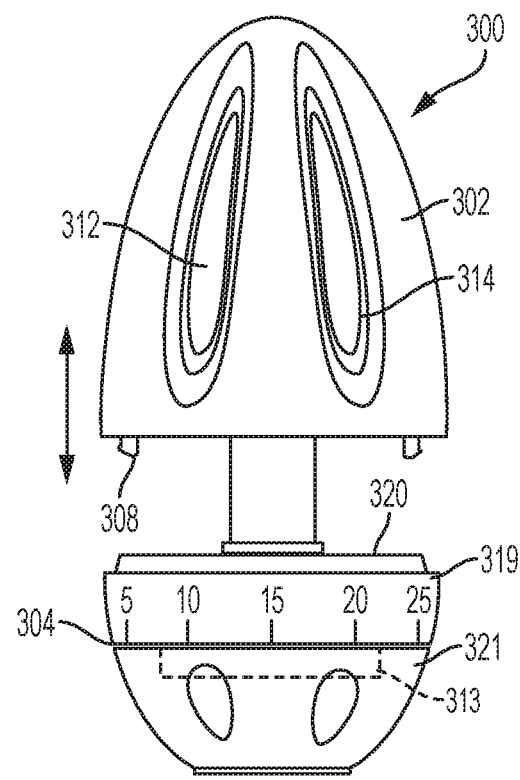
FIG. 3D is a side view of the chewable pet-entertainment device of FIG. 3A in an open position according to an exemplary embodiment.

FIG. 3A is a front view of a chewable pet-entertainment device 300 with a telescoping opening. FIG. 3B is a top view of the chewable pet-entertainment device 300. FIG. 3C is a side view of the chewable pet-entertainment device 300 in a closed position. FIG. 3D is a side view of the chewable pet-entertainment device 300 in an open position. Referring to FIGS. 3A-3D, the chewable pet-entertainment device 300 includes a first body portion 302 that is telescopically coupled to a second body portion 304. In a typical embodiment, the first body portion 302 and the second body portion 304 are constructed of a durable material such as, for example, high-density rubber, or other similar material. In some embodiments, the first body portion 302 and the second body portion 304 include a geometric pattern of raised surfaces (not shown). Such raised surfaces facilitate dental and periodontal hygiene when the chewable pet-entertainment device 300 is chewed on by a pet such as, for example, a dog. The raised surfaces may be applied to the first body portion 302 and the second body portion 304 through a process such as, for example, molding, stamping, embossing, or other appropriate process. In a typical embodiment, the pet-entertainment device 300 is sized so as to be played with and chewed on by a pet such as, for example, a dog.

In a typical embodiment, the first body portion 302 is biased in an axial direction, away from the second body portion 304, by a spring (not shown). An annular cavity 314 is formed in the first body portion 304. When the first body portion 302 is in an open position, the annular cavity 314 is accessible to a pet such as, for example, a dog. When the first body portion 302 and the second body portion 304 are in a closed position, access to the annular cavity 314 is prevented. A latch 308 is disposed on a lower face of the first body portion 302. In a typical embodiment, the latch 308 is received into a lock (not shown) that is disposed on an upper face 320 of the second body portion 304. Engagement of the latch 308 and the lock secures the first body portion 302 and the second body portion 304 in the closed position. A plurality of openings 312 are formed through a thickness of the first body portion 302. By way of example, the annular cavity 314 is shown in FIGS. 3A-3D as being disposed in the first body portion 302; however, in other embodiments, pet entertainment devices utilizing principles of the invention may include annular cavities disposed in the second body portion 304.

A timer mechanism 313 is disposed in at least one of the first body portion 302 and the second body portion 304. In a typical embodiment, the timer mechanism 313 is set by rotating a first region 321 of the second body portion 304 relative to an second region 319. The second body portion 304 is illustrated by way of example in FIGS. 3A-3D as including the first region 321 and the second region 319. In other embodiments, the first body portion 302 may include the first region 321 and the second region 319. In various embodiments, the first region 321 may be a recessed dial located on one of a bottom face of the second body portion 304 and a top face of first body portion 302.

The timer mechanism 313, in a typical embodiment, establishes a set period of time that the latch 308 remains secured in the lock thereby holding the first body portion 302 and the second body portion 304 in the closed position. Upon expiration of the set period of time, the latch 308 becomes disengaged from the lock allowing the first body portion 302 to move in an axial direction, relative to the second body portion 304, to the open position. In other embodiments, the timer mechanism 313 may be coupled to a receiver. In such embodiments, the timer mechanism 313 may be set via a transmitting device such as, for example, a cellular telephone or other similar device.

Figure 3E:
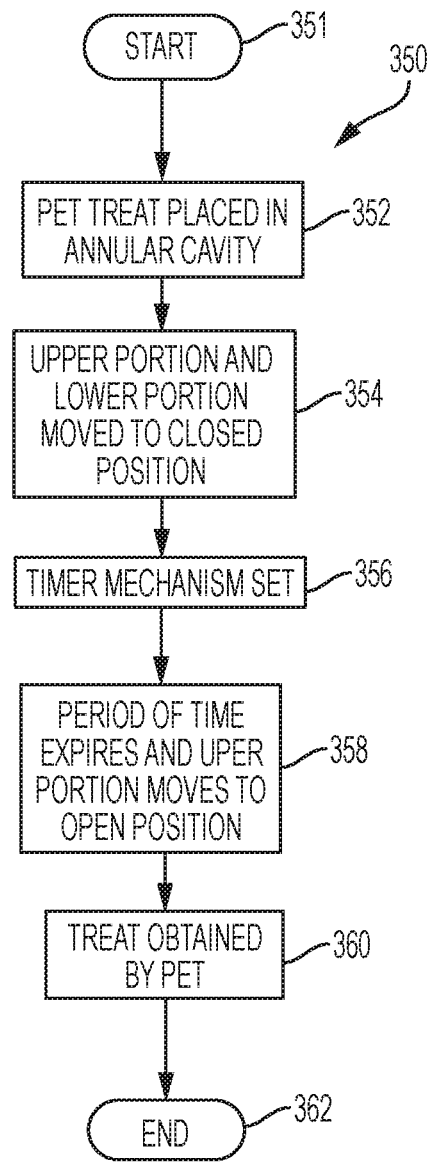
FIG. 3E is a flow diagram of a process for using the chewable pet-entertainment device of FIG. 3A according to an exemplary embodiment.

FIG. 3E is a flow diagram of a process 350 for using the chewable pet-entertainment device 300. The process 350 starts at step 351. At step 352, a pet treat is placed into the annular cavity 314 of the first body portion 302. At step 354, the first body portion 302 is moved in an axial direction towards the second body portion 304 until the latch 308 is received into the lock. At step 356, the first region 321 is twisted relative to the second region 319. Responsive to such twisting, the timer mechanism 313 establishes the set period of time. In some embodiments, steps 354 and 356 occur simultaneously. During the set period of time, the latch 308 remains secured in the lock causing the first body portion 302 and the second body portion 304 to remain in the closed position. The plurality of openings 312, allow the pet treat to be detectable via smell, but not accessible, by a pet such as, for example, a dog.

At step 358, the set period of time expires and the latch 308 becomes disengaged from the lock thereby allowing the first body portion 302 to move in an axial direction, away from the second body portion 304, to the open position. At step 360, the pet treat becomes accessible to the pet upon expiration of the set period of time. The process 350 ends at step 362.

Figure 4A:
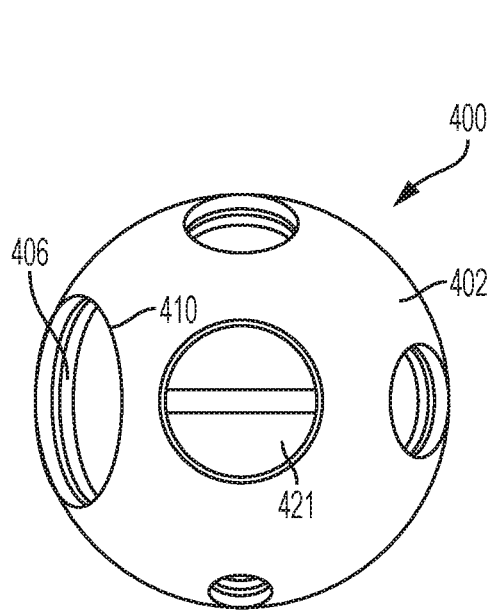
FIG. 4A is a top view of a chewable pet-entertainment device with a top-mounted dial according to an exemplary embodiment.
Figure 4B:
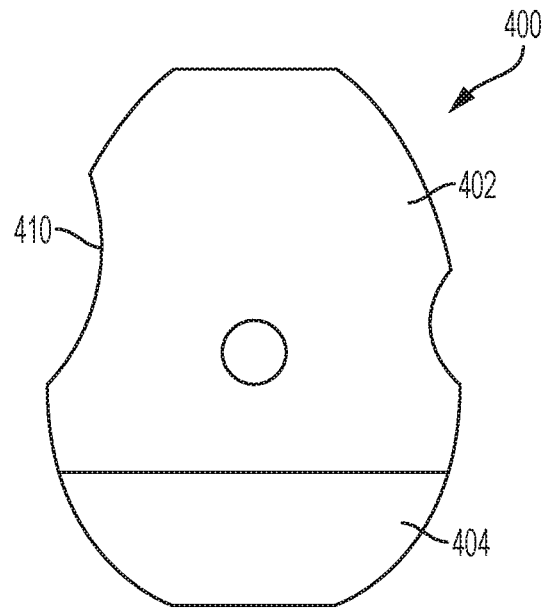
FIG. 4B is a side view of the chewable pet-entertainment device of FIG. 4A according to an exemplary embodiment.
Figure 4C:
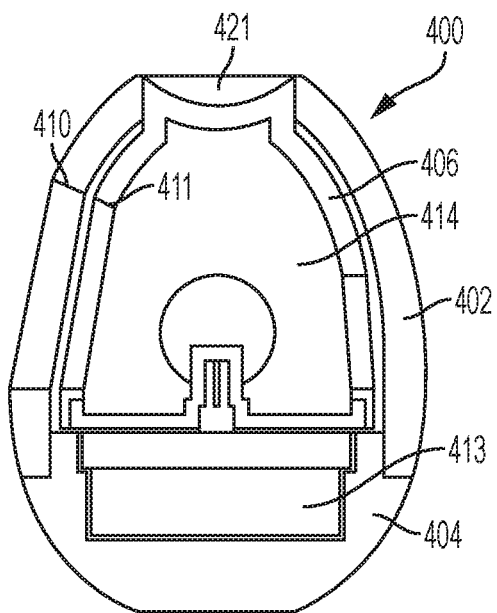
FIG. 4C is a cross-sectional view of the chewable pet-entertainment device of FIG. 4A according to an exemplary embodiment.

FIG. 4A is a top view of a chewable pet-entertainment device 400. FIG. 4B is a side view of the chewable pet-entertainment device 400. FIG. 4C is a cross-sectional view of the chewable pet-entertainment device 400. Referring to FIGS. 4A-4C, the chewable pet-entertainment device 400 includes a first body portion 402 that is coupled to a second body portion 404. In a typical embodiment, the first body portion 402 and the second body portion 404 are constructed of a durable material such as, for example, high-density rubber, or other similar material. In some embodiments, the first body portion 402 and the second body portion 404 include a geometric pattern of raised surfaces (not shown). Such raised surfaces facilitate dental and periodontal hygiene when the chewable pet-entertainment device 400 is chewed on by a pet such as, for example, a dog. The raised surfaces may be applied to the first body portion 402 and the second body portion 404 through a process such as, for example, molding, stamping, embossing, or other appropriate process. In a typical embodiment, the pet-entertainment device 400 is sized so as to be played with and chewed on by a pet such as, for example, a dog. A plurality of openings are formed through a thickness of the first body portion 402.

At least one opening 410 is formed in the first body portion 402. The at least one opening 410 provides access to a treat cage 414 disposed within the first body portion 402.

A door 406 is arranged within and generally concentric with the first body portion 402. The door 406 includes a secondary opening 411 formed therein. When the door 406 is in an open position, the at least one opening 410 and the secondary opening 411 align and allow access to the treat cage 414 by a pet such as, for example, a dog. When in a closed position, the door 406 covers the at least one opening 410 and prevents access to the treat cage 414. By way of example, the treat cage 414 and the door 406 are shown in FIGS. 4A-4C as being disposed in the first body portion 402; however, in other embodiments, pet entertainment devices utilizing principles of the invention may include treat cages and doors disposed in the second body portion 404. In a typical embodiment, the plurality of openings, allow a pet treat disposed in the treat cage 414 to be detectable via smell, but not accessible, by a pet such as, for example, a dog. In various embodiments, at least one small opening may be formed in the door 406. When the at least one small opening is aligned with one of the at least one opening 410 and the plurality of openings, smaller sized treats may fall out of the treat cage 414 thereby maintaining the interest of the pet.

A timer mechanism 413 is disposed in at least one of the first body portion 402 and the second body portion 404. In a typical embodiment, the timer mechanism 413 is set by rotating a dial 421 relative to the first body portion 402. In a typical embodiment, the dial 421 is operatively coupled to the door 406. The door 406 is operatively coupled to the timer mechanism 413. Thus, rotation of the dial 421 sets the timer mechanism 413 to measure a set period of time. Rotation of the dial 421 also moves the door 406 from the open position to a closed position, in which closed position the at least one opening 410 and the secondary opening 411 do not align. The timer mechanism 413 is illustrated by way of example in FIGS. 4A-4C as being disposed in the second body portion 404; however, in other embodiments, the timer mechanism 413 may be disposed in the first body portion 402. In such other embodiments, the timer mechanism 413 is set by rotating the dial 421 relative to the second body portion 404.

A process for using the chewable pet-entertainment device 400 is similar to the process 200 described above in FIG. 2G. During operation, as the timer mechanism 413 measures the set period of time, the door 406 rotates from the closed position towards the open position. As the door 406 rotates, the at least one opening 410 gradually comes into alignment with the secondary opening 411. Upon expiration of the set period of time, the at least one opening 410 and the secondary opening 411 align thereby allowing access to the treat cage 414. In various embodiments, as the door 406 rotates the at least one small opening passes the at least one opening 410 and each opening of the plurality of openings. Such action causes the small opening to open and close thereby allowing smaller treats to fall out of the treat cage 414 before expiration of the set period of time.

In a typical embodiment, a charging base similar to the charging base 552 shown in FIG. 5C receives at least part of the second body portion 404. In a typical embodiment, an electrical connection is established between the charging base and the chewable pet-entertainment device 400 to facilitate charging of a battery. In other embodiments, the charging base utilizes induction charging.

In other embodiments, the chewable pet-entertainment device 400 is capable of electronic pairing, such as, for example, Bluetooth® pairing, with, for example, a collar (not shown). During operation, if a first pet approaches the chewable pet-entertainment device 400 while wearing a first collar that is paired with the chewable pet-entertainment device 400, no action will be taken and the first pet will be allowed to play with the chewable pet-entertainment device 400. If, however, a second pet approaches the chewable pet-entertainment device 400 while wearing a second collar that is paired with a device other than the chewable pet-entertainment device 400, the chewable pet-entertainment device 400 emits a signal causing the second collar to vibrate thereby driving the second pet away from the chewable pet-entertainment device 400. In other embodiments, the chewable pet-entertainment device emits a sound that is unpleasant to the second pet thereby driving the second pet away from the chewable pet-entertainment device 400. Such an arrangement is advantageous in situations where two or more pets are in close proximity to each other.

In various embodiments, when the first body portion 402 opens relative to the second body portion 404 the chewable pet-entertainment device 400 provides alert messages to a transmitting device such as, for example, the transmitting device 501 shown in FIG. 5C, thereby alerting a pet owner that the chewable pet-entertainment device 400 has opened. The alert messages may be sent via a messaging protocol such as, for example, SMS, MMS, or any other messaging protocol. In various embodiments, the chewable pet-entertainment device 400 records an amount of time, via an activity log, that a pet is engaged with the chewable pet-entertainment device 400. The activity log may, in some embodiments, be transmitted by the chewable pet-entertainment device 400 to the transmitting device for review by a pet owner. In still other embodiments, the transmitting device provides a signal to the chewable pet-entertainment device 400 directing the first body portion 402 to open relative to the second body portion 404 without regard to the timer mechanism. Such an arrangement is useful in situations, for example, where a pet becomes frustrated by the chewable pet-entertainment device 400 by providing an instant reward to the pet.

Figure 5B:
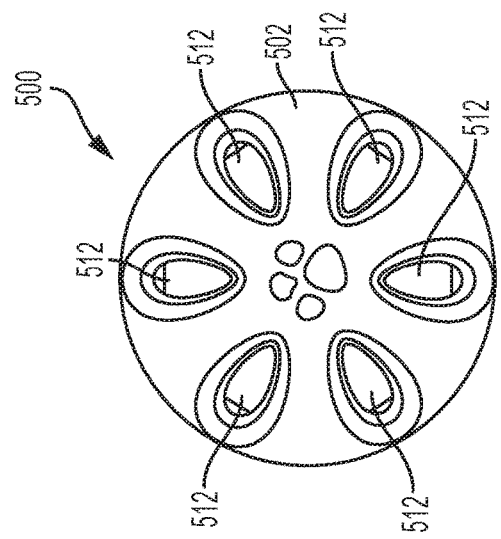
FIG. 5B is a top view of the chewable pet-entertainment device of FIG. 5A according to an exemplary embodiment.

FIG. 5A is a side view of a chewable pet-entertainment device 500. FIG. 5B is a top view of the chewable pet-entertainment device 500. FIG. 5C is a side view of a pet-entertainment system 550 including the chewable pet-entertainment device 500. Referring to FIGS. 5A-5C, the chewable pet-entertainment device 500 includes a first body portion 502 that is telescopically coupled to a second body portion 504. In a typical embodiment, the first body portion 502 and the second body portion 504 are constructed of a durable material such as, for example, high-density rubber, or other similar material. In some embodiments, the first body portion 502 and the second body portion 504 include a geometric pattern of raised surfaces (not shown). Such raised surfaces facilitate dental and periodontal hygiene when the chewable pet-entertainment device 500 is chewed on by a pet such as, for example, a dog. The raised surfaces may be applied to the first body portion 502 and the second body portion 504 through a process such as, for example, molding, stamping, embossing, or other appropriate process. In a typical embodiment, the pet-entertainment device 500 is sized so as to be played with and chewed on by a pet such as, for example, a dog.

In a typical embodiment, the first body portion 502 is biased in an axial direction, away from the second body portion 504, by a spring (not shown). An annular cavity 514 is formed in the first body portion 504. When the first body portion 502 is in an open position, the annular cavity 514 is accessible to a pet such as, for example, a dog. When the first body portion 502 and the second body portion 504 are in a closed position, access to the annular cavity 514 is prevented. A latch 508 is disposed on a lower face of the first body portion 502. In a typical embodiment, the latch 508 is received into a lock (not shown) that is disposed on an upper face 520 of the second body portion 504. Engagement of the latch 508 and the lock secures the first body portion 502 and the second body portion 504 in the closed position. A plurality of openings 512 are formed through a thickness of the first body portion 502. By way of example, the annular cavity 514 is shown in FIGS. 5A-5C as being disposed in the first body portion 502; however, in other embodiments, pet entertainment devices utilizing principles of the invention may include annular cavities disposed in the second body portion 504. The plurality of openings 512, allow an edible treat 513 disposed in the annular cavity 514 to be detectable via smell, but not accessible, by a pet such as, for example, a dog.

A timer mechanism 517 is disposed in at least one of the first body portion 502 and the second body portion 504. In a typical embodiment, the timer mechanism 517 establishes a set period of time that the latch 508 remains secured in the lock thereby holding the first body portion 502 and the second body portion 504 in the closed position. Upon expiration of the set period of time, the latch 508 becomes disengaged from the lock allowing the first body portion 502 to move in an axial direction, relative to the second body portion 504, to the open position allowing access to, for example, the edible treat 513 contained in the annular cavity 514.

In a typical embodiments, the timer mechanism 517 is coupled to a receiver (not shown) disposed in at least one of the first body portion 502 and the second body portion 504. The timer mechanism 517 is set via a transmitting device 501 such as, for example, a cellular telephone or other similar device. An indicator 519 is disposed on the second body portion 504. The indicator 519 visually displays via, for example, a plurality of lights, a time remaining of the set period of time. An audio speaker 503 is disposed on the second body portion 504. During operation, the audio speaker 503 emits sounds. In a typical embodiment, the sounds emitted from the audio speaker 503 facilitate locating the chewable pet-entertainment device 500 by at least one of a pet and a pet owner. In other embodiments, the sounds emitted by the audio speaker 503 facilitate holding the attention of the pet during the set period of time. In various embodiments, the chewable pet-entertainment device may vibrate or shake thereby making the chewable pet-entertainment device more interesting to the pet. A battery (not shown) is disposed in at least one of the first body portion 504 and the second body portion 504. In a typical embodiment, the battery provides electrical power to the timer mechanism 517 and the audio speaker 503.

As shown in FIG. 5C, the pet-entertainment system 550 includes the chewable pet-entertainment device 500 and a charging base 552. In a typical embodiment, the charging base 552 receives at least part of the second body portion 504. In a typical embodiment, an electrical connection is established between the charging base 552 and the chewable pet-entertainment device 500 to facilitate charging of the battery. In other embodiments, the charging base 552 utilizes induction charging.

In other embodiments, the chewable pet-entertainment device 500 is capable of electronic pairing, such as, for example, Bluetooth® pairing, with, for example, a receiving collar (not shown). During operation, if a first pet approaches the chewable pet-entertainment device 500 while wearing a first collar that is paired with the chewable pet-entertainment device 500, no action will be taken and the first pet will be allowed to play with the chewable pet-entertainment device 500. If, however, a second pet approaches the chewable pet-entertainment device 500 while wearing a second collar that is paired with a device other than the chewable pet-entertainment device 500, the chewable pet-entertainment device 500 emits a signal causing the second collar to vibrate thereby driving the second pet away from the chewable pet-entertainment device 500. In other embodiments, the chewable pet-entertainment device emits a sound that is unpleasant to the second pet thereby driving the second pet away from the chewable pet-entertainment device 500. Such an arrangement is advantageous in situations where two or more pets are in close proximity to each other.

In various embodiments, when the first body portion 502 opens relative to the second body portion 504 the chewable pet-entertainment device 500 provides alert messages to the transmitting device 501 thereby alerting a pet owner that the chewable pet-entertainment device 500 has opened. The alert messages may be sent via a messaging protocol such as, for example, SMS, MMS, or any other messaging protocol. In various embodiments, the chewable pet-entertainment device 500 records an amount of time, via an activity log, that a pet is engaged with the chewable pet-entertainment device 500. The activity log may, in some embodiments, be transmitted by the chewable pet-entertainment device 500 to the transmitting device 501 for review by a pet owner. In still other embodiments, the transmitting device 501 provides a signal to the chewable pet-entertainment device 500 directing the first body portion 502 to open relative to the second body portion 504 without regard to the timer mechanism 513. Such an arrangement is useful in situations, for example, where a pet becomes frustrated by the chewable pet-entertainment device 500 by providing an instant reward to the pet.

Figure 6F:
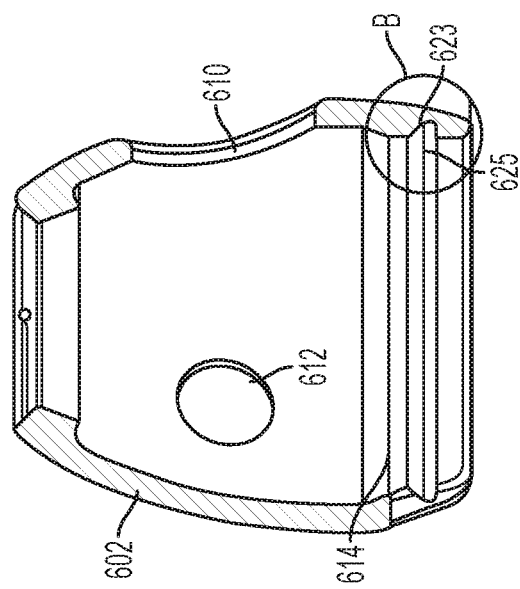
FIG. 6F is a cross-sectional view, taken along line A-A of the modular body portion of FIG. 6A according to an exemplary embodiment.
Figure 6E:
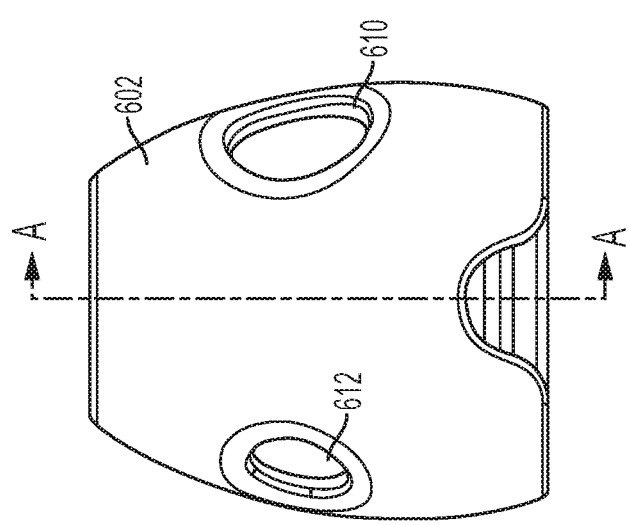
FIG. 6E is a plan view of a modular body portion of FIG. 6A according to an exemplary embodiment.
Figure 6G:
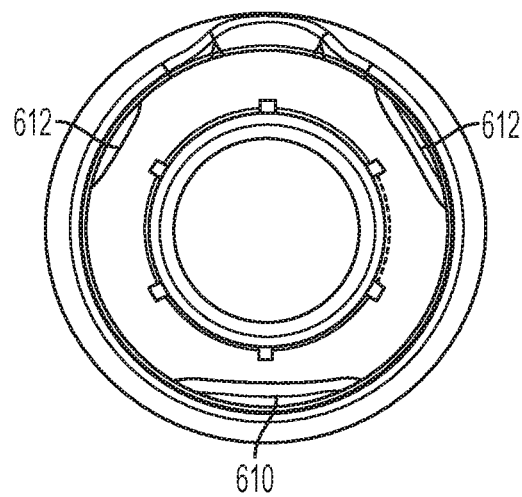
FIG. 6G is a top view of the modular body portion of FIG. 6A according to an exemplary embodiment.
Figure 6I:
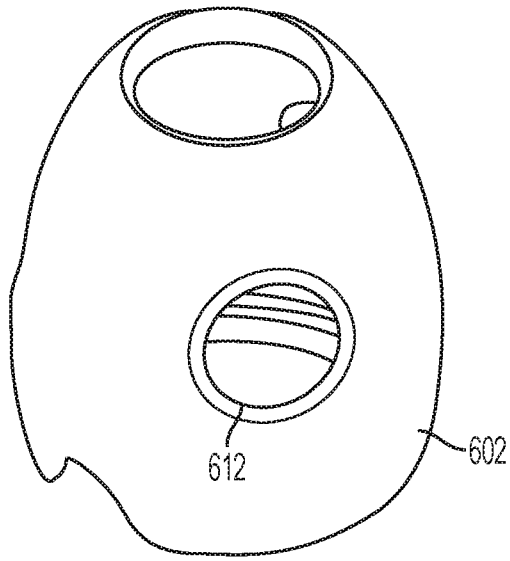
FIG. 6I is a perspective view of the modular body portion of FIG. 6A according to an exemplary embodiment.
Figure 6H:
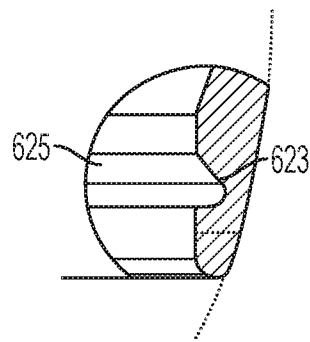
FIG. 6H is a detail view of area B of FIG. 6F of a connection mechanism of the modular body portion of FIG. 6A according to an exemplary embodiment.

FIG. 6A is a side view of a chewable pet-entertainment device 600 having a modular body portion. FIG. 6B is a side view of the chewable pet-entertainment device 600 illustrating a removal of a first body portion 602. FIG. 6C is a side view of the chewable pet-entertainment device illustrating placement of a different first body portion 602'. FIG. 6D is a side view of the chewable pet-entertainment device 600 including the different first body portion 602'. FIG. 6E is a plan view of the first body portion 602. FIG. 6F is a cross-sectional view of the first body portion 602. FIG. 6G is a top view of the first body portion 602. FIG. 6H is a detail view of a connection mechanism with the first body portion 602. FIG. 6I is a perspective view of the first body portion 602. Referring to FIGS. 6A-6I collectively, the chewable pet-entertainment device 600 includes a first body portion 602 that is coupled to a second body portion 604.

In a typical embodiment, the first body portion 602 and the second body portion 604 are constructed of a durable material such as, for example, high-density rubber, or other similar material. In some embodiments, the first body portion 602 and the second body portion 604 include a geometric pattern of raised surfaces 603. Such raised surfaces 603 facilitate dental and periodontal hygiene when the chewable pet-entertainment device 600 is chewed on by a pet such as, for example, a dog. The raised surfaces 603 may be applied to the first body portion 602 and the second body portion 604 through a process such as, for example, molding, stamping, embossing, or other appropriate process. By way of example, the first body portion 602 is illustrated in FIGS. 6A-6I as being removable, modular, and replaceable with a different first body portion 602'. Such a feature allows the first body portion 602 to be exchanged with different first body portions such as, for example, the different first body portion 602'. In various embodiments, the different first body portion 602' exhibits, for example, material of differing rigidity, elasticity, texture, taste, smell, or other properties. In a typical embodiment, exchange of the first body portion 602 allows the chewable pet-entertainment device 600 to be catered to the preferences of a specific pet.

As illustrated in FIGS. 6F and 6H, the first body portion 602 is coupled to the treat cage 614 via a connection mechanism. By way of example, the connection mechanism is illustrated in FIGS. 6F and 6H as being a groove 623 formed about a circumference of the first body portion 602. The groove 623 engages with a lip 625 formed about a circumference of a lower aspect of the treat cage 614. Thus, the first body portion 602 is secured to the treat cage 614 via a frictional engagement. In a typical embodiment, the frictional engagement between the groove 623 and the lip 625 is sufficiently strong that the first body portion 602 cannot be removed from the treat cage 614 by a pet such as, for example, a dog. The connection mechanism is illustrated by way of example in FIGS. 6F and 6H as including the groove 623 and the lip 625; however, in other embodiments, the connection mechanism could include, for example, a threaded connection, or any other type of connection as dictated by design requirements. Though not specifically shown in FIGS. 6A-6I, in various embodiments, pet entertainment devices utilizing principles of the present invention may include second body portions that are modular or replaceable. In various other embodiments, both the first body portion 602 and the second body portion 604 are modular and replaceable.

At least one first opening 610 is formed in the first body portion 602. At least one second opening 611 is formed in the treat cage 614. When the first body portion 602 is in an open position, the first opening 610 and the at least one second opening 611 align in registry and provide access to the treat cage 614. Thus, when the first body portion 602 is in the open position, a treat may exit the treat cage 614. Alternatively, a pet such as, for example, a dog may access the treat cage 614 and retrieve the treat.

When the first body portion 602 is in a closed position, the first opening 610 and the at least one second opening 611 do not align in registry. In a typical embodiment, a portion of the treat cage 614 covers the at least one first opening 610 and prevents access to the treat cage 614. By way of example, the treat cage 614 is shown in FIGS. 6A-6I as being disposed in the first body portion 602; however, in other embodiments, pet entertainment devices utilizing principles of the invention may include treat cages disposed in the second body portion 604. In various embodiments, at least one third opening 612 may be formed in the first body portion 602. In a typical embodiment, the at least one third opening 612 is of a smaller size than the at least one first opening 610. When the at least one third opening 612 is aligned with the second opening 611, smaller-sized treats may fall out of the treat cage 614 thereby maintaining the interest of the pet.

In a typical embodiment, the at least one third opening 612 includes a plurality of openings. In a typical embodiment, the plurality of openings are of a variety of different sizes. For example, in a typical embodiment, each successive opening of the plurality is progressively larger than the preceding opening. During operation, each successive opening 612 will align in registry with the second opening 611 in sequence as the first body portion 602 moves towards the open position. When the first body portion 602 reaches the open position, the at least one first opening 610 aligns with the at least one second opening 611. Such an arrangement allows progressively larger treats to escape the treat cage 614 as the first body portion 602 progresses to the open position thereby maintaining the interest of the pet. In a typical embodiment, the pet-entertainment device 600 is sized so as to be played with and chewed on by a pet such as, for example, a dog.

A timer mechanism (not shown) is disposed in at least one of the first body portion 602 and the second body portion 604. In a typical embodiment, the timer mechanism is set by rotating, for example, the first body portion 602 relative to the treat cage 614 and the second body portion 604. In other embodiments, the second body portion 604 be rotated relative to the treat cage 614 and the first body portion 602 to set the timer mechanism. In various embodiments, the timer mechanism may be set by rotating a dial disposed on at least one of the first body portion 602 and the second body portion 604. In such embodiments, the dial is rotated relative to at least one of the first body portion 602 and the second body portion 604.

The timer mechanism, in a typical embodiment, establishes a set period of time that the first body portion 602 will remain in the closed position. As the set period of time expires, the first body portion 602 gradually rotates relative to the treat cage 614 to the open position. As the first body portion 602 rotates towards the open position, openings of the plurality of openings 612 are opened in a sequential and progressive manner allowing progressively larger treats to escape the treat cage 614. When the first body portion 602 comes to the open position, the pet has access to the treat cage 614. In other embodiments, the timer mechanism may be coupled to a receiver. In such embodiments, the timer mechanism may be set via a transmitting device such as, for example, a cellular telephone or other similar device.

In a typical embodiment, a charging base similar to the charging base 552 shown in FIG. 5C receives at least part of the second body portion 604. In a typical embodiment, an electrical connection is established between the charging base and the chewable pet-entertainment device 600 to facilitate charging of a battery. In other embodiments, the charging base utilizes induction charging.

In other embodiments, the chewable pet-entertainment device 600 is capable of electronic pairing, such as, for example, Bluetooth® pairing, with, for example, a collar (not shown). During operation, if a first pet approaches the chewable pet-entertainment device 600 while wearing a first collar that is paired with the chewable pet-entertainment device 600, no action will be taken and the first pet will be allowed to play with the chewable pet-entertainment device 600. If, however, a second pet approaches the chewable pet-entertainment device 600 while wearing a second collar that is paired with a device other than the chewable pet-entertainment device 600, the chewable pet-entertainment device 600 emits a signal causing the second collar to vibrate thereby driving the second pet away from the chewable pet-entertainment device 600. In other embodiments, the chewable pet-entertainment device emits a sound that is unpleasant to the second pet thereby driving the second pet away from the chewable pet-entertainment device 600. Such an arrangement is advantageous in situations where two or more pets are in close proximity to each other.

In various embodiments, when the first body portion 602 opens relative to the second body portion 604 the chewable pet-entertainment device 600 provides alert messages to a transmitting device such as, for example, the transmitting device 501 shown in FIG. 5C, thereby alerting a pet owner that the chewable pet-entertainment device 600 has opened. The alert messages may be sent via a messaging protocol such as, for example, SMS, MMS, or any other messaging protocol. In various embodiments, the chewable pet-entertainment device 600 records an amount of time, via an activity log, that a pet is engaged with the chewable pet-entertainment device 600. The activity log may, in some embodiments, be transmitted by the chewable pet-entertainment device 600 to the transmitting device for review by a pet owner. In still other embodiments, the transmitting device provides a signal to the chewable pet-entertainment device 600 directing the first body portion 602 to open relative to the second body portion 604 without regard to the timer mechanism. Such an arrangement is useful in situations, for example, where a pet becomes frustrated by the chewable pet-entertainment device 600 by providing an instant reward to the pet.

The advantages of the chewable pet-entertainment device (100, 200, 300, 400, 500, 600) will be apparent to those skilled in the art. First, incorporation of the timer mechanism allows a pet owner to determine the set period of time the pet is to remain engaged and entertained. In a typical embodiment, the timer mechanism is set for as long as, for example, approximately 60 minutes or more, or as short as, for example, 1 minute. In other embodiments, the timer mechanism randomly selects the set period of time or randomly selects the set period of time within a user-defined range of times. Further, the timer mechanism allows a different set period of time to be utilized with each use of the chewable pet-entertainment device (0, 200, 300, 400, 500, 600). Thus, by randomly selecting different periods of time, the pet cannot anticipate when the treat will be made accessible thereby keeping the pet interested and entertained. Finally, the pet can chew on or play with the chewable pet-entertainment device (0, 200, 300, 400, 500, 600) during the pre-determined set period of time measured by the timer mechanism.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A chewable pet-entertainment device comprising:
   a treat cage having a first section comprising an arcuate exterior surface and a second section comprising a cylindrical exterior surface, the second section extending upwardly from the first section;
   a first body portion comprising a first flat surface on a top thereof and removably coupled to the treat cage, the first body portion having an interior surface, wherein the exterior surface of the treat cage is not parallel to the interior surface of the first body portion, the first section and the second section being entirely received into the first body portion
   an alternate first body portion that is selectively interchangeable with the first body portion, the alternate first body portion having properties different from the first body portion;
   a second body portion operatively coupled to the treat cage, the first body portion and the second body portion together concealing the treat cage;
   the first body portion and the second body portion forming an ovoid shape, wherein the second body portion comprises a second flat surface on a bottom thereof, and wherein the second body portion comprises symmetrically declining radii centered about a central axis of the second body portion from a top of the second body portion to the second flat surface thereby defining a lower portion of the ovoid shape;
   a timer disposed in at least one of the first body portion and the second body portion; and
   responsive to the timer measuring a set period of time, the first body portion moves relative to the second body portion, allowing access to the treat cage.

2. The chewable pet-entertainment device of claim 1, wherein:
   the first body portion is hingedly connected to the second body portion; and
   the first body portion opens in a clam-shell-like manner relative to the second body portion.

3. The chewable pet-entertainment device of claim 1, wherein:
   the first body portion is slidably connected to the second body portion; and
   the first body portion opens telescopically relative to the second body portion.

4. The chewable pet-entertainment device of claim 1, comprising a plurality of openings formed in the first body portion, the plurality of openings being of a variety of different sizes.

5. The chewable pet-entertainment device of claim 1, wherein at least one of the first body portion and the second body portion comprises a first region rotatably coupled to a second region.

6. The chewable pet-entertainment device of claim 5, wherein rotation of the first region relative to the second region sets the timer to measure the set period of time.

7. The chewable pet-entertainment device of claim 1, wherein the treat cage contains an edible treat.

8. The chewable pet-entertainment device of claim 7, wherein opening of the first body portion relative to the second body portion allows access to the treat cage.

9. The chewable pet-entertainment device of claim 1, wherein the chewable pet-entertainment device communicates electronically with a transmitting device.

10. The chewable pet-entertainment device of claim 9, wherein the chewable pet-entertainment device includes a battery.

11. The chewable pet-entertainment device of claim 10, wherein the battery is operable to be charged via induction charging.

12. The chewable pet-entertainment device of claim 1, wherein the chewable pet-entertainment device is electronically paired with a receiving collar.

13. A chewable pet-entertainment device comprising:
   a treat cage having a first section comprising an arcuate exterior surface and a second section comprising a cylindrical exterior surface, the second section extending upwardly from the first section;
   a first body portion comprising a first flat surface on a top thereof and removably coupled to the treat cage, the first body portion having an interior surface, wherein the exterior surface of the treat cage is not parallel to the interior surface of the first body portion, the first section and the second section being entirely received into the first body portion;
   an alternate first body portion that is selectively interchangeable with the first body portion, the alternate first body portion having properties different from the first body portion, the first body portion being movable between an open position and a closed position;

a second body portion coupled to the treat cage, the first body portion and the second body portion concealing the treat cage;

the first body portion and the second body portion forming an ovoid shape, wherein the second body portion comprises a second flat surface on a bottom thereof, and wherein the second body portion comprises symmetrically declining radii centered about a central axis of the second body portion from a top of the second body portion to the second flat surface thereby defining a lower portion of the ovoid shape;

a timer mechanism disposed in at least one of the first body portion and the second body portion;

a plurality of progressively-sized openings defined in the first body portion, the plurality of progressively-sized openings allowing access to the treat cage when an opening of the plurality of progressively-sized openings is aligned with an opening in the treat cage, the plurality of progressively-sized openings being obstructed when the first body portion is in the closed position; and wherein, responsive to the timer mechanism measuring a set period of time, the first body portion moves from the closed position to the open position, allowing progressively-increasing access to the treat cage as the first body portion moves from the closed position to the open position.

14. The chewable pet-entertainment device of claim 13, wherein:

at least one of the first body portion and the second body portion comprises a first region rotatably coupled to a second region; and rotation of the first region relative to the second region sets the timer mechanism to measure the set period of time.

* * * * *